(12) United States Patent
Birru et al.

(10) Patent No.: US 7,206,352 B2
(45) Date of Patent: Apr. 17, 2007

(54) ATSC DIGITAL TELEVISION SYSTEM

(75) Inventors: Dagnachew Birru, Yorktown Heights, NY (US); Vasanth R. Gaddam, Ossining, NY (US); Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 828 days.

(21) Appl. No.: 10/078,933

(22) Filed: Feb. 19, 2002

(65) Prior Publication Data

US 2002/0181581 A1 Dec. 5, 2002

Related U.S. Application Data

(60) Provisional application No. 60/280,782, filed on Apr. 2, 2001.

(51) Int. Cl.
*H04L 23/02* (2006.01)
*H04L 5/12* (2006.01)

(52) U.S. Cl. .............. 375/265; 375/262; 375/264; 375/240.1; 348/426.1; 348/429; 704/222

(58) Field of Classification Search ........ 375/265, 375/296, 321, 240.28, 240.27, 295, 240.26; 348/724, 433.1, 432, 723, 21
See application file for complete search history.

(56) References Cited

U.S. PATENT DOCUMENTS

| | | | |
|---|---|---|---|
| 4,621,365 A * | 11/1986 | Chiu | 375/149 |
| 5,479,449 A * | 12/1995 | Patel et al. | 375/316 |
| 5,619,269 A * | 4/1997 | Lee et al. | 375/240.01 |
| 5,640,431 A * | 6/1997 | Bruckert et al. | 375/344 |
| 5,719,899 A * | 2/1998 | Thielecke et al. | 375/144 |
| 5,796,787 A * | 8/1998 | Chen et al. | 375/326 |
| 5,884,947 A * | 3/1999 | Lopez et al. | 292/198 |
| 6,717,961 B1 * | 4/2004 | Park | 370/538 |
| 6,958,781 B2 * | 10/2005 | Fimoff | 348/555 |
| 2001/0038663 A1 * | 11/2001 | Medlock | 375/142 |

(Continued)

OTHER PUBLICATIONS

Mycynek, V.; Kim, J.G.; Turner, R.; Cookson, L.; Kabashima, A., "ATSC VSB IF/demodulation IC development", Consumer Electronics, IEEE Transactions vol. 44, Issue: 3, Aug. 1998.*

(Continued)

*Primary Examiner*—Mohammed Ghayour
*Assistant Examiner*—Qutub Ghulamali
(74) *Attorney, Agent, or Firm*—Larry Liberchuk

(57) ABSTRACT

This disclosure describes a flexible digital transmission system that improves upon the ATSC A/53 HDTV signal transmission standard. The system includes a digital television signal transmitter for generating a first Advanced Television Systems Committee (ATSC) standard 8-VSB bit stream and, for generating an encoded new bit stream capable of transmitting high priority information bits, wherein symbols of the new bit stream are capable of being transmitted according to a transmission mode selected from group comprising: a 2-VSB mode, a 4-VSB mode, and a hierarchical-VSB (H-VSB) transmission mode. Each respective 2-VSB, 4-VSB, and H-VSB mode is characterized as having symbols mapped according to possible symbol values from an alphabet comprising respectively, $\{-7, -5, 5, 7\}$, $\{7, 3, -3, -7\}$, and $\{7, 5, 3, -3, -5, -7\}$. The standard 8-VSB bit stream and new bit stream may be simultaneously transmitted over a terrestrial channel according to a broadcaster defined bit-rate ratio.

35 Claims, 5 Drawing Sheets

U.S. PATENT DOCUMENTS

| | | | | |
|---|---|---|---|---|
| 2002/0001349 | A1* | 1/2002 | Bretl et al. | 375/240.26 |
| 2002/0064209 | A1* | 5/2002 | Turetzky et al. | 375/142 |
| 2002/0136274 | A1* | 9/2002 | Proctor et al. | 375/142 |
| 2004/0101046 | A1* | 5/2004 | Yang et al. | 375/240.08 |
| 2004/0184721 | A1* | 9/2004 | Birmingham | 385/24 |
| 2005/0141606 | A1* | 6/2005 | Choi et al. | 375/240 |

OTHER PUBLICATIONS

Ji-Sung Oh; Yong-Duk Chang; Hyun-Soo Shin; Myeong-Hwan Lee; Ki-Bum Kim, "A design of VSB receiver IC for digital television", Consumer Electronics, ICCE. International Conference, 1999.*

Sgrignoli, G., "Preliminary DTV field test results and their effects on VSB receiver design", Consumer Electronics, IEEE Transactions, vol. 45, Issue: 3, Aug. 1999, pp. 894-915.*

Bretl, W.E.; In-Hwan Choi; Fimoff, M.; Young-Mo Gu; Snopko, P, "E-VSB-an 8-VSB compatible system with improved white noise and multipath performance", Consumer Electronics, IEEE Transactions, vol. 47, Issue 3, Aug. 2001, pp. 307-312.*

Ji-Sing Oh; Yong-Duk Chang; Hyun-Soo Shin; Myeong-Hwan Lee; Ki-Burn Kim, "A design of VSB receiver IC for digital television", Consumer Electronics, ICCE. International Conference, 1999.*

Viterbi, Andrew J. et al., "Nonlinear Estimation of PSK-Modulated Carrier Phase with Application to Burst Digital Transmission", IEEE Transactions on Information Theory, IT-29 (4), pp. 543-551, Jul. 1983.*

Kato, Shuzo et al., "XPSK: A New Cross-Correlated Phase-Shift Keying Modulation Technique", IEEE Transaction on Communication, pp. 701-707, May 1983.*

US 010553, U.S. Appl. No. 10/011,968, filed: Dec. 3, 2001.

US 010027, U.S. Appl. No. 09/781,486, filed: Feb. 12, 2001.

US 010278P, U.S. Appl. No. 60/295,616, filed: Jun 4, 2001.

* cited by examiner

ATSC DIGITAL TELEVISION SYSTEM

CROSS-REFERENCE TO RELATED APPLICATION

The present invention claims the benefit of commonly-owned, U.S. Provisional Patent Application Ser. No. 60/280,782 filed Apr. 2, 2001. This patent application is additionally related to commonly-owned, co-pending U.S. patent application Ser. No. 10/011,968, filed Dec. 3, 2001, entitled APPARATUS AND METHOD FOR GENERATING ROBUST ATSC 8-VSB BIT STREAMS, the entire contents and disclosure of which is incorporated by reference as if fully set forth herein.

BACKGROUND OF THE INVENTION

1. Field of the Invention

The present invention relates to digital transmission systems and particularly, to the Advanced Television Systems Committee (ATSC) Digital Television (DTV) standard (A/53). The invention describes a method for transmitting a robust bit-stream along with the standard bit-stream using the ATSC standard in a backward compatible manner.

2. Discussion of the Prior Art

The ATSC standard for high-definition television (HDTV) transmission over terrestrial broadcast channels uses a signal that comprises a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is broadcast at a data rate of 19.39 million bits per second (Mbps). Details regarding the (ATSC) Digital Television Standard and the latest revision A/53 is available at http://www.atsc.org/.

FIG. 1 is a block diagram generally illustrating an exemplary prior art high definition television (HDTV) transmitter 100. MPEG compatible data packets are encoded for forward error correction (FEC) by a Reed Solomon (RS) encoder unit 110. The data packets in successive segments of each data field are then interleaved by data interleaver 120, and the interleaved data packets are then further interleaved and encoded by trellis encoder unit 130. Trellis encoder unit 120 produces a stream of data symbols having three (3) bits each. One of the three bits is pre-coded and the other two bits are produced by a four (4) state trellis encoder. The three (3) bits are then mapped to an 8-level symbol as shown in unit 134 (FIG. 3).

As known, trellis encoder unit 130 comprises twelve (12) parallel trellis encoder and pre-coder units to provide twelve interleaved coded data sequences. In multiplexer 140 the symbols of each trellis encoder unit are combined with "segment sync" and "field sync" synchronization bit sequences from synchronization unit 150. A pilot signal is then inserted by pilot insertion unit 160. The symbol stream is then subjected to vestigial sideband (VSB) suppressed carrier modulation by VSB modulator 170. The symbol stream is then finally up-converted to a radio frequency by radio frequency (RF) converter 180.

While the existing ATSC 8-VSB A/53 digital television standard is sufficiently capable of transmitting signals that overcome numerous channel impairments such as ghosts, noise bursts, signal fades and interferences in a terrestrial setting, there exists a need for flexibility in the ATSC standard so that streams of varying priority and data rates may be accommodated.

It would thus be highly desirable to provide a flexible ATSC digital transmission system and methodology that permits a trade-off of the standard bit-stream's data rate for the new bit-stream's robustness.

It would further be highly desirable to provide in an ATSC digital transmission system, an improved technique for transmitting a new bit-stream along with the standard ATSC bit-stream wherein the new bit-stream has a lower Threshold of Visibility (TOV) compared to the ATSC stream, and consequently can be used for transmitting high priority information bits (robust bit-stream).

It would further be highly desirable to provide a terrestrial broadcast system that supports a flexible payload data-rate in a 6-Mhz channel with a flexible Carrier-Noise Ratio (CNR).

It would be further highly desirable to incorporate within the existing ATSC digital transmission standard an improved technique for transmitting a new bit-stream along with the standard ATSC bit-stream wherein the new bit-stream includes high priority information bits, and such that the transmission is backward compatible with existing digital television receiver devices.

SUMMARY OF THE INVENTION

Accordingly, it is an object of the present invention to provide a flexible ATSC digital transmission system and methodology that permits a trade-off of the standard bit-stream's data rate for the new bit-stream's robustness.

It is a further object of the present invention to provide in an ATSC digital transmission system, an improved technique for transmitting a new robust bit-stream along with the standard ATSC bit-stream wherein the new bit-stream has a lower Threshold of Visibility (TOV) compared to the ATSC stream, and consequently can be used for transmitting high priority information bits (robust bit-stream). That is, the robust bit-stream may be decodable at a lower TOV and in severe multi-path channel, thus enabling more receivers to receive the signal (effectively increasing the coverage area).

It is another object of the present invention to provide a terrestrial broadcast system that supports a flexible payload data-rate in a 6-Mhz channel with a flexible CNR.

It is yet another object of the present invention to incorporate within the existing ATSC digital transmission standard an improved technique for transmitting a new bit-stream along with the standard ATSC bit-stream wherein the new bit-stream includes high priority information bits, and such that the transmission is backward compatible with existing digital television receiver devices.

It is still another object of the present invention to provide an ATSC digital transmission system and methodology that permits a trade-off of the standard bit-stream's data rate for the new bit-stream's robustness wherein symbols belonging to the standard stream and the new stream are multiplexed and transmitted over a terrestrial channel by the transmitter according to a broadcaster defined bit-rate ratio.

In accordance with the preferred embodiments of the invention, there is provided a digital signal transmission system and methodology comprising: a means for generating a first Advanced Television Systems Committee (ATSC) standard 8-VSB bit stream; a means for generating a new bit stream capable of transmitting high priority information bits, said new bit stream and said standard 8-VSB bit stream capable of being simultaneous transmitted over a fixed bandwidth communications channel to a receiver device capable of receiving said standard and new bit stream, wherein the data rate of the standard bit stream is inversely related to a degree of robustness of information bits comprising the new bit-stream.

In accordance with the preferred embodiments, the two bit-streams are multiplexed at the packet level. The new stream uses robust symbol mapping schemes to transmit one bit of information (robust) per symbol. Three such methods are described including: a pseudo 2-VSB, 4-VSB and hierarchical-VSB (H-VSB). In the pseudo 2-VSB and H-VSB modes, the sign of the symbol indicates the robust information bit. In the 4-VSB mode, the information bit is trellis coded using the existing trellis encoder.

Transmission of a new bit-stream along with the standard ATSC bit-stream using pseudo 2-VSB, 4-VSB, and hierarchical VSB (H-VSB) symbol mapping techniques requires the mapping of symbols, respectively, from the alphabet [7, 5, −5, −7], [7, 3, −3, −7], and [7, 5, 3, −3, −5, −7].

To insure backward compatibility with existing receivers from various manufacturers, an optional "non-systematic" Reed-Solomon encoder may be used to add parity bytes to the robust bit-stream packets. The standard 8-VSB bit-stream will be encoded using the ATSC FEC scheme (A/53). Packets transmitted using the new bit-stream will be ignored by the transport layer decoder of the existing receiver. Thus, the effective payload that can be decodable by existing receivers is reduced due to the insertion of the new bit-stream.

BRIEF DESCRIPTION OF THE DRAWINGS

Details of the invention disclosed herein shall be described below, with the aid of the figures listed below, in which.

DETAILED DESCRIPTION OF THE PREFERRED EMBODIMENTS

Co-pending, commonly-owned U.S. patent application Ser. No. 10,/011,968 filed Dec. 3, 2001 entitled APPARATUS AND METHOD FOR GENERATING ROBUST ATSC 8-VSB BIT STREAMS, the whole contents and disclosure of which is incorporated by reference as if fully set forth herein, describes a system that enables the transmission of a more robust ATSC 8-VSB stream, i.e., a hierarchical VSB or H-VSB, by a digital transmitter. According to this reference, a new ATSC 8-VSB bit stream ("New Stream") is provided in which each bit in a first portion of the bits (e.g., half of the bits) is robust (the "Robust Stream"). The error correcting capacity of bits in the Robust Stream is greater than the error correcting capacity of bits in a standard ATSC 8-VSB bit stream. The present invention herein described in accordance with FIG. 2 improves upon the digital transmission system described in herein incorporated, commonly-owned U.S. patent application Ser. No. 10/011,968 by enabling flexible transmission rates for Robust and Standard streams for accommodating a large range of carrier-to-noise ratios and channel conditions.

Figure 1:
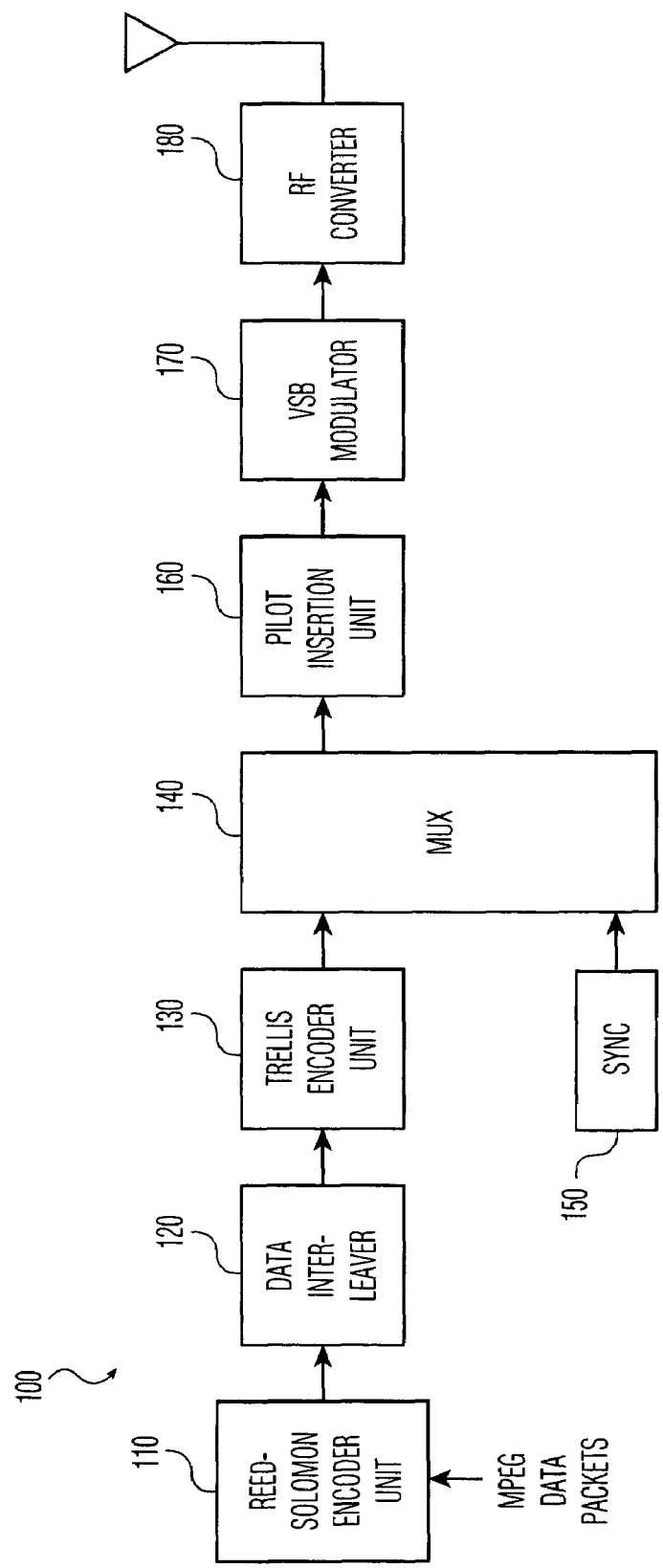
FIG. 1 illustrates a block diagram of an exemplary high definition television (HDTV) transmitter.
Figure 2:
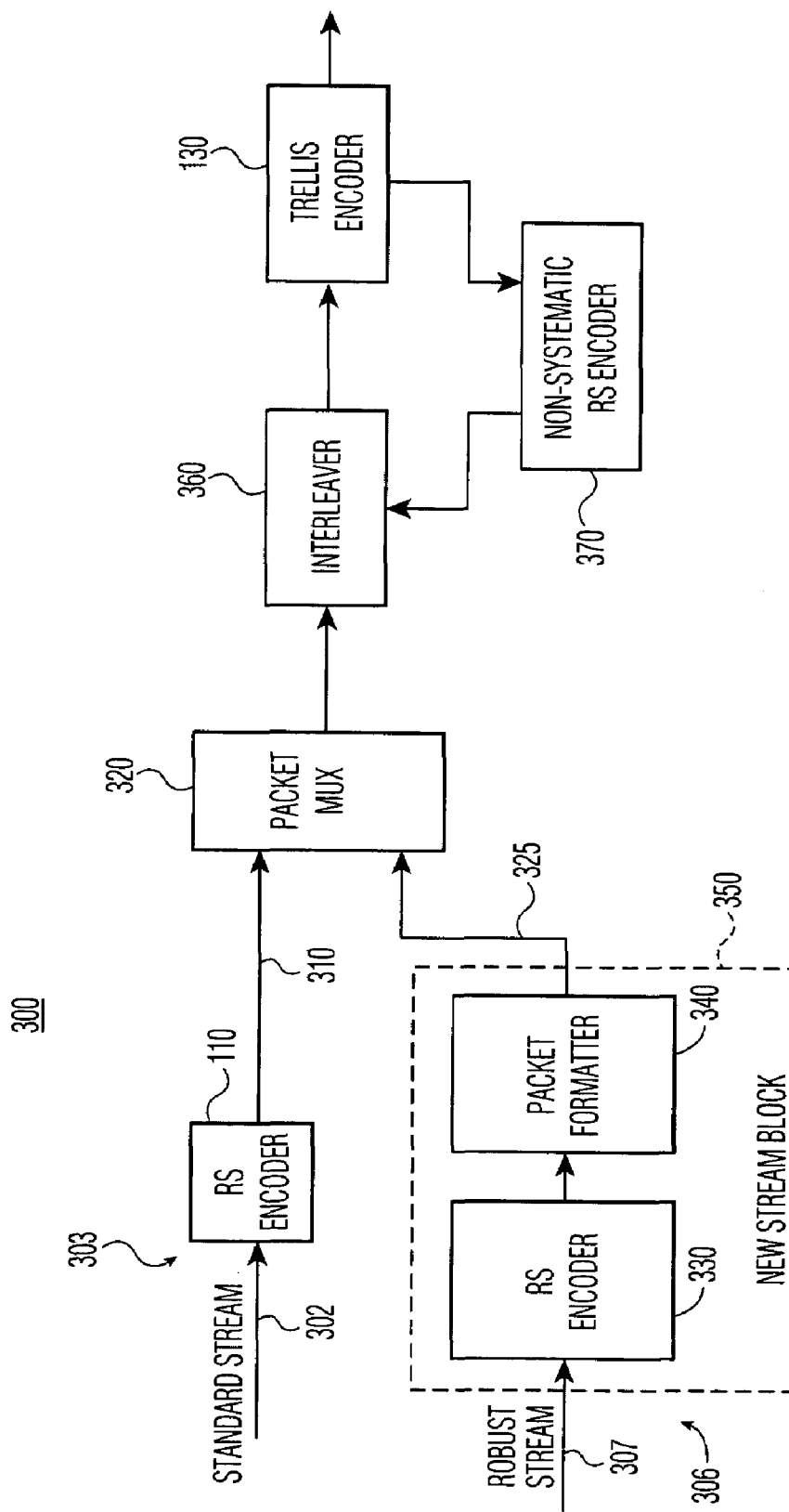
FIG. 2 is a simplified top-level diagram of the improved digital broadcast system 300 for pseudo 2-VSB and 4-VSB according to the present invention.

A representative functional diagram of the improved digital transmission system 300 for pseudo 2-VSB and 4-VSB according to the invention is now described with respect to FIG. 2. As shown in FIG. 2, the system 300 includes two packet stream paths: a first path 303 corresponding to receipt and processing of the existing ATSC standard bitstream 302 and a second path 306 corresponding to the new (robust) bitstream 307. Preferably, the standard data and robust stream inputs 302, 307 to the system comprise MPEG compatible packets.

All packets sent via the first path (i.e., the standard or 8-VSB stream 302) are sent using the existing 8-VSB coding scheme. Thus, as shown in FIG. 2, a regular ATSC 8-VSB bit stream (Standard Stream) is input to the Reed Solomon (RS) encoder unit 110. The output 310 of the RS Encoder 110 is input to a packet multiplexer (MUX) 320, which, as will be described, multiplexes both standard stream and robust packets from the respective first and second paths.

As will be described, all packets sent via the robust path 306 are sent using the pseudo 2-VSB or 4-VSB coding scheme in a backward compatible manner. Particularly, the second path 306 includes a new stream processing block 350 including Reed-Solomon encoder device 330 and a packet formatter 340 for processing the input robust stream as will be described in greater detail herein.

Generally, the Standard Stream from Reed Solomon (RS) encoder 110 and the New Stream 325 from the new stream processing block 350 are multiplexed on a packet basis in multiplexer (MUX) 320. The multiplexed Standard Stream and New Stream pass through convolutional data interleaver 360 and then trellis encoded in trellis encoder unit 130. Data interleaver 360 rearranges the bytes of the multiplexed Standard Stream and New Stream during the interleaving process. Trellis encoder 130 encodes bytes belonging to the multiplexed Standard Stream 310 and New Stream 325 and maps the symbols generated by the Standard Stream bytes and by the New Stream bytes in a trellis encode symbol mapper unit as will be described. Additionally, as shown in FIG. 2, there is provided a "non-systematic" Reed Solomon (RS) encoder unit 370 which is a device that is used to satisfy backward compatibility requirements in existing ATSC DTV receivers. An advantageous embodiment of Reed Solomon (RS) encoder 330 is set forth and described in U.S. patent application Ser. No. 09/781,486 entitled "System and Method for Sending Low Rate Data on a Packet Basis in an 8-VSB Standard Data Packet Stream" filed on Feb. 12, 2001. The disclosures of U.S. patent application Ser. No. 09/781,486 are hereby incorporated by reference in the present patent application as if fully set forth herein. Generally, according to the invention, the "non-systematic" RS encoder 370 ensures that the existing receivers will identify the robust stream packets as valid RS code-words, particularly, by enabling a packet identifier (PID) corresponding to the robust stream packets (for existing receivers) to comprise a Null packet header.

The symbol mapping schemes acording to the invention are now described. Typical VSB receiver devices such as shown in FIG. 2 typically make use of the trellis decoder to aid channel equalization. Thus, it is imperative that the trellis decoder continues to function and decode symbols corresponding to the new stream with reasonable accuracy, so that the performance of the existing receiver won't deteriorate when the new robust stream is transmitted. The proposal uses the existing trellis encoding scheme without any change in the way bytes are read from the data interleaver 360 into the trellis encoder. There is also no change in encoding the packets corresponding to the standard stream.

Figure 3:
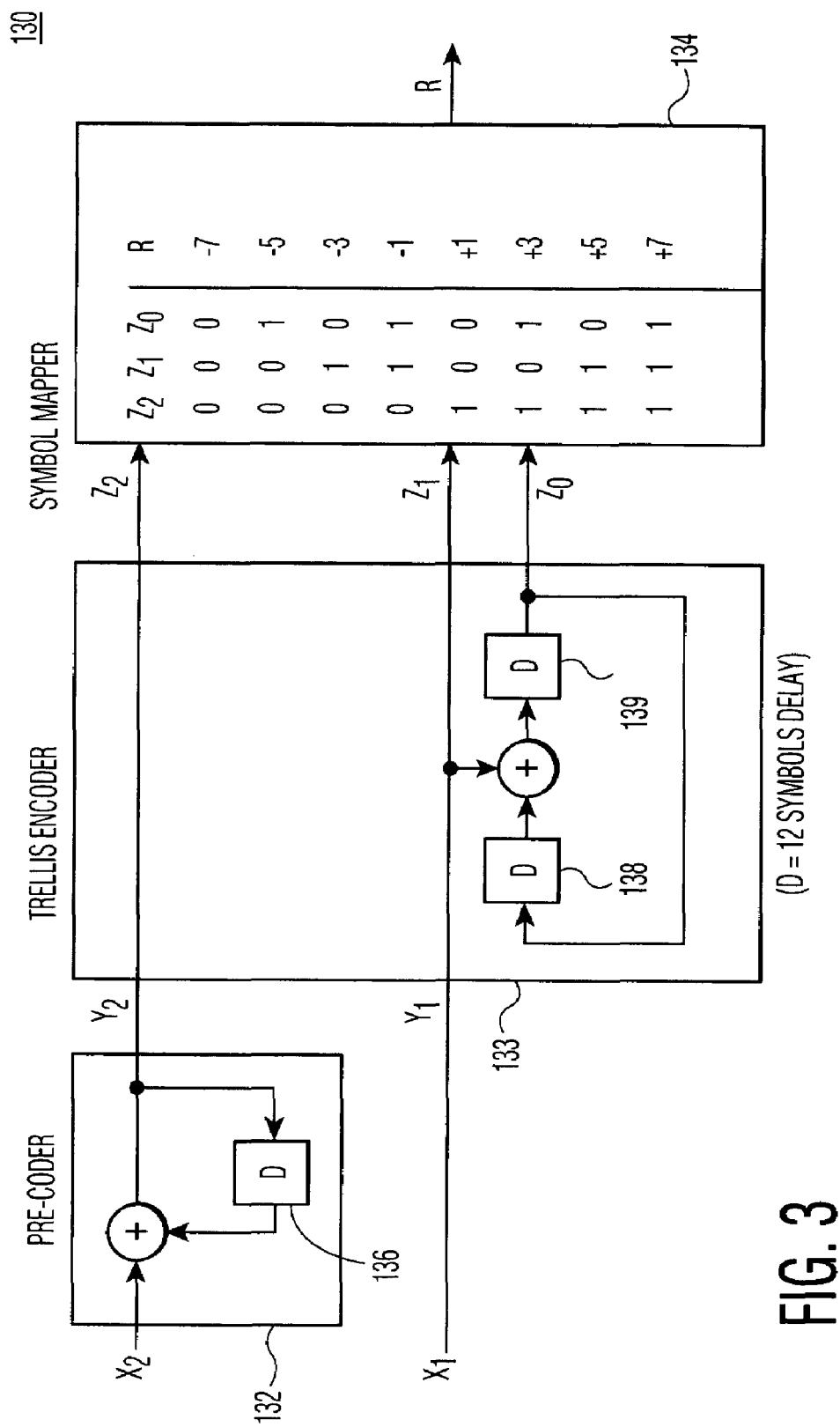
FIG. 3 is a block diagram of one exemplary prior art trellis encoder and pre-coder unit (one of twelve such units shown in FIG. 2) and an eight (8) level symbol mapper; and, FIG. 4 illustrates a simplified diagram of the H-VSB system mode for HDTV 400 in accordance with the principles of the present invention.

A detailed functional diagram of an exemplary prior art trellis encoder 130 is shown in FIG. 3. As shown in FIG. 3, the trellis encoder 133 and pre-coder unit 132 provide their outputs to an eight (8) level symbol mapper 134. A multiplexer for coupling the trellis encoder 133 and pre-coder unit 132 to eight (8) level symbol mapper 134 is not shown in FIG. 3. According to the transmission scheme of the invention, each data symbol to be encoded comprises two bits, $X_1$ and $X_2$. Bit $X_2$ is pre-coded by pre-coder 132 which comprises a one bit register 136 to derive pre-coded bit $Y_2$. The Bit $Y_2$ is not altered further by trellis encoder 130 and is output as bit $Z_2$. The other input bit, $X_1$, does not pass through pre-coder 132 but does pass through trellis encoder 133 as bit $Y_1$. Trellis encoder 133 encodes bit $X_1$ in accordance with a rate-½ convolutional code utilizing one bit data registers, 138, 139. The result is output as bit $Z_0$ and bit $Z_1$. Therefore, three bits (i.e., bit $Z_0$, bit $Z_1$, and bit $Z_2$) are output by trellis encoder 130 to eight (8) level symbol mapper 134. The eight (8) level symbol mapper 134 converts the three bits $Z_0$, $Z_1$ and $Z_2$ to a value "R" in an eight (8) level constellation of permissible code values. The permissible code values for R are −7, −5, −3, −1, +1, +3, +5, and +7. These values correspond with the three bit combinations shown in eight (8) level symbol mapper 134. Further details regarding the trellis-encoder unit 130 may be found in herein-referenced, commonly-owned, co-pending U.S. patent application Ser. No. 10/011,968.

According to the invention, for the robust stream 325, the trellis encoder 130 receives a byte, of which only 4-bits (LSBs) contain valid information. When a byte that belongs to the robust stream is received by the trellis encoder 130, the information bits (i.e., LSBs bits (6,4,2,0)) are placed on X1, and X2 is subsequently determined to obtain the particular symbol mapping scheme. Once X2 is determined, the 4-MSBs of the byte, e.g., bits (7,5,3,1) will be replaced by these values. When all the bits of a byte are determined, a new byte will then have been formed containing the LSBs and the MSBs. This byte is then passed to the "non-systematic" Reed-Solomon encoder 370 of FIG. 2. As will be described in greater detail, the parity bytes of the "non-systematic" Reed-Solomon encoder 370 and the PID bytes (not shown) will however be encoded using the 8-VSB encoding scheme. The symbol mapping techniques for each mode are now described as follows:

Pseudo 2-VSB Mode

In view of FIG. 3, the 2-VSB mode is obtained by making Z2 and Z1 equal to the information bit X1 (i.e., LSB bits (6,4,2,0)). The X2 is then calculated such that, when pre-coded, it results in Z2. This operation is nothing other than X2=X1+Y2$d$ mod 2, where Y2$d$ is the content of the register 136 of the pre-coder 132. This operation, combined with the existing symbol mapping scheme, results in symbols from the alphabet {−7, −5, 5, 7}. This is essentially a pseudo 2-VSB signal in the sense that the information bit is transmitted as the sign of this symbol. The actual symbol is a valid trellis coded 4-level symbol which can be decoded by existing trellis decoder devices.

4-VSB Mode

In view of FIG. 3, the 4-VSB mode is obtained by making Z1 equal to the information bit. X2 is then calculated such that when pre-coded, Z2 equals Z0. This operation is nothing other than X2=Z0+Y2$d$ mod 2, where Y2$d$ is the content of the pre-coder register 136. These operation and the use of the existing symbol mapping results in symbols from the alphabet {−7, −3, 3, 7} which is essentially a trellis coded 4-VSB symbol. The actual 4-level symbol is a valid trellis coded symbol that can be decoded by existing trellis decoders.

Referring back to FIG. 2, the new stream processor block 350 is primarily composed of a Reed-Solomon encoder 330 and a packet formatter 340. The Reed-Solomon encoder 330 adds parity bytes to the robust packets in the same manner as the Reed-Solomon encoder 110 of the standard stream. The incoming 187-byte packet (e.g., of an incoming MPEG-II packet) is appended with 20 parity bytes to result in 207 bytes. These bytes will then be post processed and sent using robust constellations. The packet formatter 340 essentially buffers and groups the incoming bit-stream into groups of 207 bytes. In general, only 4 bits of each byte at the packet formatter output, the LSBs (6,4,2,0), correspond to the incoming stream. The other 4 bits of each byte, the MSBs (7,5,3,1), may be set to any value.

Referring back to FIG. 2, if the "non-systematic" Reed-Solomon encoder is used, then only 187 bytes will be created in this way to carry 4*187 bits of the robust stream. The remaining 20 bytes will be determined after these 187 bytes are trellis coded in a special way to obtain (pseudo) 2-VSB and 4-VSB symbols. In creating the 207 bytes, the 187 bytes containing the information stream and the other 20 bytes, the specific values of which are at this processing stage yet to be determined, will be permuted in such a way that after the data interleaver, these 20 bytes will appear at the end of the 187 bytes. At this new stream processing stage, the values of the 20 bytes can be set to any value. If, however, the "non-systematic" Reed-Solomon encoder is not used, then all the LSBs of the 207 bytes will correspond to 207*4 bits from the incoming robust bit-stream. In this case, the 187-byte MPEG compliant packet will be transmitted using 828*2 symbols.

In addition to the above, the packet formatter 340 may additionally add an optional PID, e.g., 3-bytes, such that the existing receivers will process packets containing the robust stream as null packets. This PID will typically be set to "null packet". When is the PID bytes are inserted, the information bits of the robust stream will be included in 184 bytes only. This mode implies the use of the "non-systematic" Reed-Solomon encoder. This mode, incorporated for the purpose of improving backward compatibility, will reduce the effective data rate as 23 bytes (20 parity bytes and 3 PID bytes) have to be added per packet by the packet formatter.

Referring again to FIG. 2, the present invention provides various options as to how the new packets will be processed by existing receivers. The first option is one for which the new packets will not be correctly decoded by the Reed-Solomon decoders of existing receivers. The second option is one for which the new packets will be decoded correctly by the Reed-Solomon decoders of existing receivers. However, the existing receivers will not be able to decode the information from these packets. This option is proposed to provide the flexibility to cover the widest possible set of the existing receivers from different manufacturers. The use of the additional ("non-systematic") Reed-Solomon encoder to insure backward compatibility, however, reduces the total payload by an amount equal to the parity bytes. When all of the existing receivers are phased out, broadcasters may choose not to use this option, to increase the effective payload of the robust stream.

The Reed-Solomon encoder defined in the existing ATSC A/53 standard appends parity bytes at the end of the 187-byte packet to yield a 207-byte codeword. This encoding scheme is known as a systematic code. However, Reed-Solomon codes need not be systematic. Given a particular application, the encoding may be performed in such a way that the parity bytes are placed in arbitrary positions in the total 207 available byte positions. The resulting codeword is a valid Reed-Solomon codeword from the systematic code family. A Reed-Solomon decoder does not need knowledge of the parity byte positions. Thus, an unmodified Reed-Solomon decoder that decodes the systematic code will additionally decode this code.

In the encoding process, the "non-systematic" Reed-Solomon encoder collects all the 187 bytes corresponding to the robust stream. The trellis encoder produces these bytes as described herein. Given the positions of the parity bytes, the Reed-Solomon encoder then produces 20 parity bytes corresponding to this packet. The parity bytes will then be appropriately placed in the data interleaver at the positions corresponding to the last 20 bytes of the 207 byte packet.

The hierarchical VSB (H-VSB) mode transmits 2-bits of information per symbol with different degrees of priority. In a similar manner to the DVB-T hierarchical mode, the sign of the symbols corresponds to the high-priority bit while the level within a symbol corresponds to the low-priority bit.

In this H-VSB mode, the overall payload of the system is not significantly reduced, unlike for the pseudo 2-VSB and 4-VSB modes. The broadcaster will be able to transmit three bit-streams: one stream being the regular ATSC bit-stream (Standard Stream, SS) and the other two new bit-streams being (New Stream, NS, comprised of a "robust" stream (high priority bit-stream)) and an "embedded" stream (low priority bit-stream). A new receiver would be able to decode all the bit-streams while an existing receiver will be able to decode SS packets and dump NS packets. The broadcaster has the ability to transmit different services at different levels of robustness.

Figure 4:
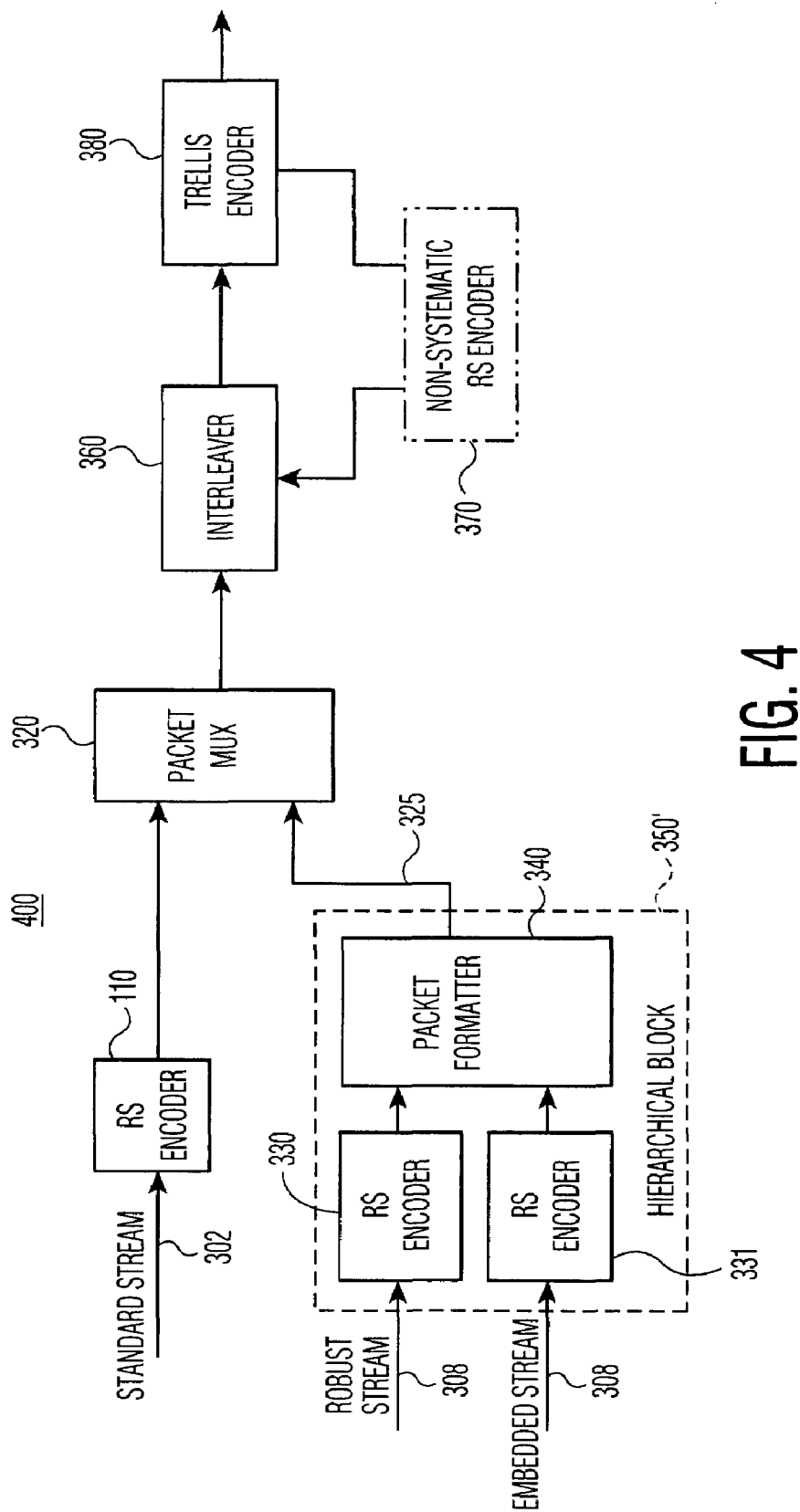

FIG. 4 illustrates a simplified diagram of the H-VSB system mode of transmission 400. As shown in FIG. 4, the two bit-streams SS 302 and NS 308, 309 are multiplexed on packet basis by the packet mux 320 at the input to the FEC block (not shown). The multiplexed bit-streams are then passed through the convolutional interleaver 360 before being encoded by a trellis encoder 380. The hierarchical block 350 processes the two streams belonging to the high priority stream 308 and the embedded low priority stream 309. Respective Reed-Solomon encoder devices 330, 331 each encodes packets corresponding to a respective stream 308, 309. The packet formatter 340 then combines these streams such that the MSBs of a byte, (i.e., bits 7,5,3,1) correspond to the high-priority stream and the LSBs, bits (6,4,2,0), of a byte correspond to the embedded stream. In general, after Reed-Solomon encoding, two 207-byte composite packets are formed from two 187-byte MPEG compliant input packets.

Figure 5:
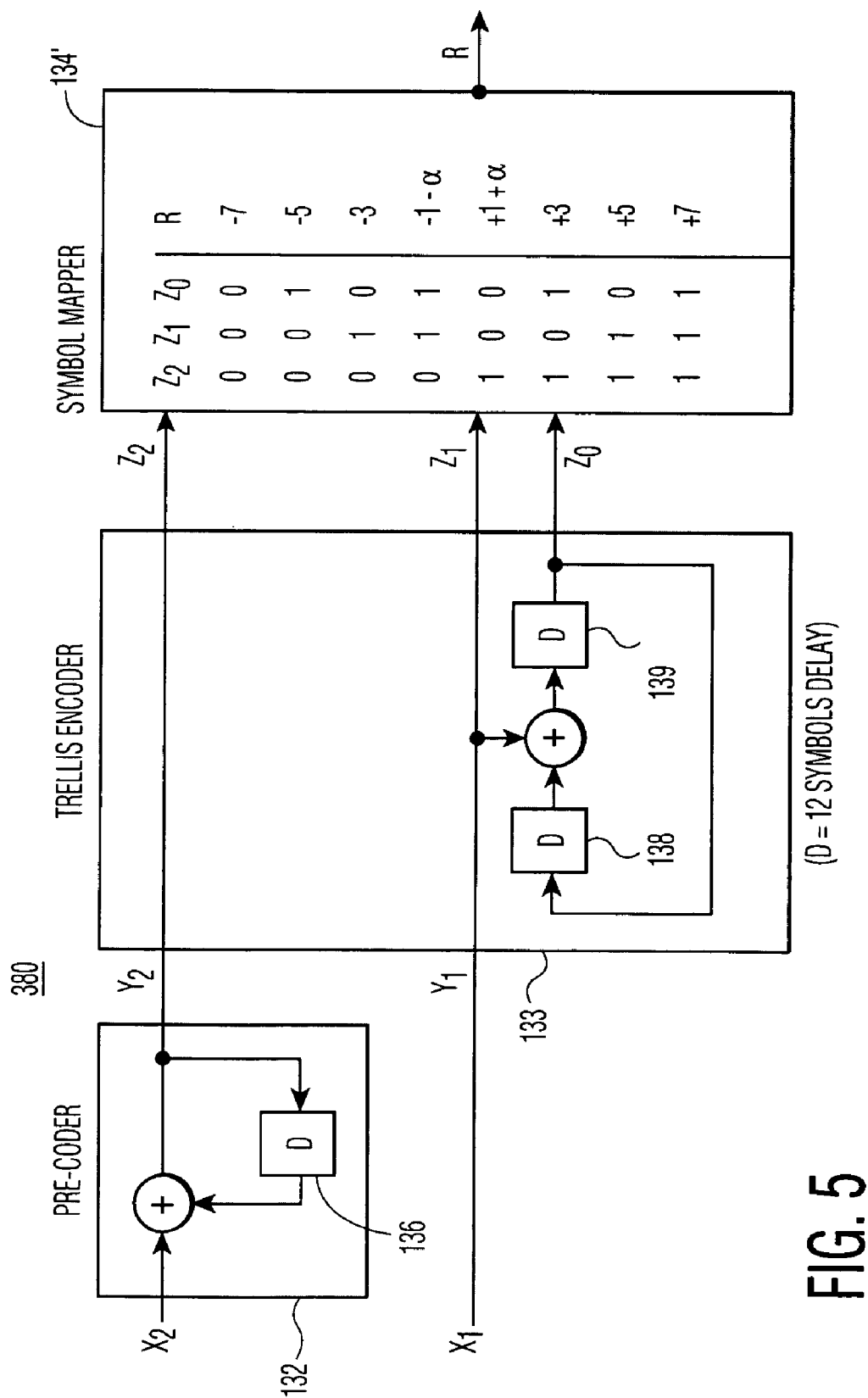
FIG. 5 is a simplified block diagram of the modified trellis encoder and modified mapping scheme for the hierarchical mode according to the invention.

In this mode, the trellis encoder 380 encodes bytes belonging to the two bit-streams and maps the symbols generated by standard stream bytes and new stream bytes using the mapping table illustrated in FIG. 5 with $\alpha=0$ and $\alpha=2$, respectively. As the bit X2 may be derived from the sign information of the received symbol, increasing the distance between +1 and −1 levels improves the reliability of this bit at the decoder. Using this new system, high priority bits of the new stream may be sent to X2 input and low priority bits of NS may be sent to X1 input of the trellis encoder. In a similar manner as for pseudo 2-VSB, X2 may additionally be computed such that the output of the pre-coder, Z2, equals the high priority bit. Subsequently, the "non-systematic" Reed-Solomon encoder 370 may then be used to add 20 parity bytes. These operations ensure that, given adequate SNR, the new packets will not be flushed as error by the Reed-Solomon decoders of existing receivers.

FIG. 5 is a simplified block diagram of the modified trellis encoder 380 and modified mapping scheme for the hierarchical mode according to the invention; further details regarding operation of the trellis-encoder may be found in herein-referenced, co-pending U.S. patent application Ser. No. 10/011,968. Generally, as described in co-pending U.S. patent application Ser. No. 10/011,968, a control block (not shown) is provided to generate the appropriate control signals necessary for setting the value of $\alpha=0$ in the symbol mapper unit, for example, when Standard Stream bytes are present in trellis encoder 380; and, setting the value of $\alpha=2$ when New Stream bytes are present in the symbol mapper unit 134'. As shown in FIG. 5, if the value of a is set equal to one (1) then the R value for the bit combination zero one one (011) is minus two (−2) and the R value for the bit combination one zero zero (100) is plus two (+2). Because the $X_2$ bit can be derived from the sign information of the received symbol, increasing the distance between the −1 level and the +1 level improves the reliability of the $X_2$ bit at the decoder. When the value of $\alpha$ is set equal to zero (0) the distance between the −1 level and the +1 level is two (2) units. When the value of $\alpha$ is set equal to two (2) the distance between the −3 level and the +3 level is equal to six (6) units. In this alternate advantageous embodiment of the present invention, the $Z_2 Z_1 Z_0$ bits "010" and the $Z_2 Z_1 Z_0$ bits "011" both give the same R value of minus three (−3). This is not a problem because for the Robust Stream only the sign of the received symbol is needed. So for both "010" and "011" the sign is negative and the decoded bit $X_2$ is zero (0). Similarly, the $Z_2 Z_1 Z_0$ bits "100" and the $Z_2 Z_1 Z_0$ bits "101" both give the same R value of plus three (+3). For both "100" and "101" the sign is positive and the decoded bit $X_1$ is one (1). Using the apparatus and method of the present invention, the high priority bits in a New Stream (i.e., the Robust Stream) can be sent to the $X_2$ input of trellis encoder 630 and the low priority bits in a New Stream (i.e., the Embedded Stream) may be sent to the $X_1$ input of trellis encoder 380. Packet multiplexer 320 ensures that the $X_2$ input of trellis encoder 380 receives the Robust Stream bits and that the $X_1$ input of trellis encoder 380 receives the Embedded Stream bits.

In an alternative embodiment, the control information for setting the values of the $\alpha$ in the symbol mapper unit 134' for pseudo 2-VSB, 4-VSB and H-VSB modes, is communicated at the packet level according to the method described in commonly-owned, co-pending U.S. Provisional Patent Application Ser. No. 60/295,616 filed Jun. 4, 2001 and entitled PACKET IDENTIFICATION MECHANISM AT THE TRANSMITTER AND THE RECEIVER FOR AN ENHANCED ATSC 8-VSB SYSTEM, the entire contents and disclosure of which is incorporated by reference as if fully set forth herein.

An intended receiver, depending on its state (location, mobility, etc.) may decode the high priority information (robust stream) and if the SNR is sufficient may additionally decode the low priority information (standard and embedded streams). In an existing receiver, the new stream will cause some errors during the trellis decoding process. As a result of this, the receiver will use some of its error correcting capability to correct these errors. This will cause the TOV to increase by a small amount. Once all the packets are corrected by the FEC, the transport layer (or the MPEG decoder) will discard the packets belonging to the new stream NS and will only use packets belonging to the standard stream for source decoding.

According to the invention, in the manner described in commonly-owned, co-pending U.S. patent application Ser. No. 10/118,876 entitled PACKET IDENTIFICATION MECHANISM AT THE TRANSMITTER AND THE RECEIVER FOR AN ENHANCED ATSC 8-VSB SYSTEM, the transmitter specifies, on a data field basis (313 segments), the placement of the new robust packets within a field. To simplify receiver implementation, the first symbol of a specified segment in a field may correspond to the first symbol of the robust packet. The number and mode of the robust packets are specified in the reserved bits of the field sync segment. All the information needed to decode the robust packets are specified in the reserved bits. This information includes: 1) the Mode (i.e., pseudo 2-VSB, 4-VSB, H-VSB); 2) whether the optional "non-systematic" RS encoder is used; and, 3) the number of robust packets that start in the following field.

The improved digital transmission system of the invention incorporates a built-in flexibility enabling adaptation to different types of channels, while at the same time providing flexibility in the overall payload distribution. It is capable of operating at low CNR in different channel impairment environment viz. Gaussian, Ricean and Rayleigh. The system may withstand strong (up to 0 dB), long delay static multi-path interference and also dynamic multi-path interference.

The system further features a number of selectable parameters that accommodate a large range of carrier-to-noise ratios and channel conditions. It allows fixed, portable and/or mobile reception by trading off the data rates for robustness. This wide range of parameters allows the broadcasters to select a mode appropriate for current applications or for some anticipated future applications. For instance, a moderately robust mode (with a correspondingly lower data rate) is needed to ensure reliable portable reception with a simple set-top antenna. A less robust mode with a higher data rate can be used where the service can be received at relatively higher TOV. The less robust modes with larger payloads may be used for fixed reception while the robust modes with the smaller payloads may be used for mobile and portable reception.

Table 1 presents representative payload (Mb/s) and performance parameters for different bit-rate ratios of the new stream to the standard 8-VSB stream. An intended representative receiver is assumed for all the performance parameters.

TABLE 1

| Mix ratio (New/8-VSB). | Mix with 2-VSB or 4-VSB | | | Mix with Hierarchical VSB | | | |
|---|---|---|---|---|---|---|---|
| | Robust stream | Standard stream | Total | Robust stream | Embedded stream | Standard stream | Total |
| 100/0 | 8.7–9.6 | — | 8.7–9.6 | 8.7–9.6 | 8.7–9.6 | — | 17.4–19.3 |
| 50/50 | 4.3–4.8 | 9.6 | 13.9–14.4 | 4.3–4.8 | 4.3–4.8 | 9.6 | 18.2–19.3 |
| 20/80 | 1.7–1.9 | 15.4 | 17.1–7.3 | 1.7–1.9 | 1.7–1.9 | 15.4 | 18.8–19.3 |
| 10/90 | 0.9–1.0 | 17.3 | 18.2–18.3 | 0.9–1.0 | 0.9–1.0 | 17.3 | 19.1–19.3 |
| 0/100 | — | 19.3 | 19.3 | — | — | 19.3 | 19.3 |

Table 2 illustrates the TOV (in db) of pseudo 2-VSB, 4VSB, H-VSB and 8-VSB for AWGN channel for an intended (new) receiver for a bit - error rate of $2*10^{-3}$ at the Reed-Solomon decoder input.

TABLE 2

| Mix ratio | 2-VSB | 4-VSB | H-VSB: robust | H-VSB: embedded | 8-VSB-with 2-VSB | 8-VSB-with 4-VSB | 8-VSB with H-VSB |
|---|---|---|---|---|---|---|---|
| 100/0 | 8.5 | 9.8 | — | — | — | — | — |
| 50/50 | 8.5 | 12.0 | 12.5 | 19.1 | 16.3 | 15.6 | 15.5 |
| 20/80 | 8.6 | 14.0 | 12.2 | 16.4 | 15.3 | 14.6 | 15.4 |
| 10/90 | 8.7 | 14.5 | 12.0 | 16.2 | 15.0 | 14.6 | 15.1 |
| 0/100 | — | — | — | — | 14.9 | 14.9 | 14.9 |

Advantageously, new receivers will be able to decode robust packets without errors even under severe static and dynamic multi-path interference environments at reduced CNR. As can be seen, the TOV (in additive white noise) is also reduced to as little as 8.5 dB. This significant improvement in performance is achieved with little performance penalty to packets encoded using the existing 8-VSB standard. Moreover, the system does not require a change in the power mask. The average power required to transmit bit-streams in different modes is almost equal to the existing levels.

Table 3 illustrates the TOV (in db) of pseudo 2-VSB, 4-VSB, H-VSB and 8-VSB for Ricean channel using a representative receiver. This is obtained for a bit-error rate of 2*10^-3 at the Reed-Solomon decoder input. The channel used is [1 0 0 0 0. 7]/sqrt (1.5)

TABLE 3

| Mix ratio | 2-VSB | 4-VSB | H-VSB: robust | H-VSB: embedded | 8-VSB with 2-VSB | 8-VSB with 4-VSB | 8-VSB with H-VSB |
|---|---|---|---|---|---|---|---|
| 100/0 | 11.4 | 15.2 | 17.0 | — | — | — | — |
| 50/50 | 10.5 | 14.6 | 16.7 | 20.3 | 20.5 | 20.1 | — |
| 20/80 | 12.3 | 18.5 | 17.0 | — | 19.0 | 18.7 | — |
| 10/90 | — | — | — | — | — | — | — |
| 0/100 | — | — | — | — | 19.1 | 19.1 | 19.1 |

Table 4 illustrates the TOV (in db) of pseudo 2-VSB, 4-VSB, H-VSB and 8-VSB for Rayleigh channel using a representative receiver. This is obtained for a bit-error rate of 2*10^-3 at the Reed-Solomon decoder input. The channel used is [1 0 0 0 1]/sqrt (2)

TABLE 4

| Mix ratio | 2-VSB | 4-VSB | H-VSB: robust | H-VSB: embedded | 8-VSB with 2-VSB | 8-VSB with 4-VSB | 8-VSB with H-VSB |
|---|---|---|---|---|---|---|---|
| 100/0 | 13.0 | 20.2 | — | — | — | — | — |
| 50/50 | — | — | — | — | — | — | — |
| 20/80 | 12.0 | >22 | — | — | — | — | — |
| 10/90 | — | — | — | — | — | — | — |
| 0/100 | — | — | — | — | 23 | 23 | 23 |

Exemplary pseudo 2-VSB and 4-VSB system modes of operation are now described. As depicted in Tables 1–4, two different bit-streams (standard bit-stream and robust bit-stream) may be transmitted using the same physical channel. As an example, according to Table 2, in pseudo 2-VSB mode, for a 20/80 (approx.) mix, robust bit-stream has a TOV at 8.6 dB while the standard bit-stream has a TOV at 15.3 dB (in AWGN environment). In 4-VSB mode, for 20/80 (approx.) mix, the robust bit-stream has a TOV at 14.0 dB while the standard bit-stream has a TOV at 14.6 dB (in AWGN environment). The performance of the standard bit-stream is affected due to the effective power reduction of the 8-VSB symbols in pseudo 2-VSB mode, while 4-VSB mode doesn't affect the standard bit-stream's performance significantly. It should be understood that any value of bit-rate ratio may be used, however, increasing the percentage of robust bit-stream will reduce the data rate of standard bit-stream. If the "non-systematic" RS encoder is used as in FIG. 2, then the system is backward compatible up to the transport layer, but the useable data rate of the robust stream is reduced. If the "non-systematic" RS encoder is not used, then the RS decoder in the existing receiver will set the error flag for the new packets. According to the 2/4-VSB systems, modifications to the ATSC FEC block include the provision of one pre-processor including an RS encoder and a packet formatter. Use of a "non-systematic" RS encoder within the FEC block is optional.

The proposal also provides a flexible scheme that allows a trade-off to be made between the payload data rates sent using the two streams. For example, using pseudo 2-VSB mode, a 2 Mbps robust bit-stream can be transmitted together with a 15.3 Mb/s standard bit-stream. In this mode, the (Additive White Gausian Noise) AWGN CNR (TOV) for the robust bit-stream and the standard bit-stream will be 8.5 dB and 15.1 dB respectively.

Exemplary H-VSB system mode of operation is now described. As depicted in Tables 1–4, two different bit-streams (standard bit-stream and robust bit-stream) may be transmitted using the same physical channel. However, the new stream in turn may comprise a robust stream and an embedded low-priority stream. The H-VSB mode of operation implements a hierarchical system in the sense that different bits have varying levels of error correcting capabilities. High priority bits of the new stream are more robust compared to the standard 8-VSB stream. The broadcaster may choose the mix of standard and new stream packets. The new stream packets may be time-multiplexed with the standard packets allowing attractive high/low priority payload tradeoffs. The total payload of the system is higher than that of 2/4-VSB systems. As in the 2/4-VSB systems, modifications to the ATSC FEC block: include the addition of one pre-processor comprising an RS encoder and a packet formatter. The "non-systematic" RS encoder within the FEC block is optional. Symbol levels are changed based on control information.

Using H-VSB mode, a 2 Mbps robust bit-stream can be transmitted along with a 15.3 Mb/s standard bit-stream and a 2 Mb/s embedded stream. The TOV in this mode is about 12 dB and 15.4 dB for the robust bit-stream and standard bit-stream respectively.

Due to various receiver implementations of different manufacturers, it is rather difficult to predict their behavior for the non standard bit-stream packets. Therefore, a flexible approach is proposed that will enable the broadcasters to adjust the system parameters to get maximum possible coverage. These include the use of an optional Reed-Solomon encoder to insure that new bit-stream packets will not be flagged as error packets by the Reed-Solomon decoder of existing receivers. The use of this optional encoder reduces the data rate of the robust bit-stream by 4*20 bits per packet, but might be useful during the initial transition period.

The 2/4-VSB and H-VSB modes of the invention as described herein, may be supported by changes in a modem part of the system. Little change is assumed on the transport layer, however, some control will be needed at the transport layer level to make sure that the modem gets the needed packet rate for each stream path. This operation, in principle, is not different from known system operation at the transport layer level.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A digital signal transmission system comprising:
   a) means for generating a first Advanced Television Systems Committee (ATSC) standard 8-Vestigal Side Band (8-VSB) bit stream;
   b) means for generating a new bit stream that transmits high priority information bits, said new bit stream and said standard 8-VSB bit stream being simultaneously transmitted over a fixed bandwidth communications channel to a receiver device, wherein a data rate of said standard bit stream is inversely related to a degree of robustness of information bits comprising said new bit-stream;
   c) a first Reed-Solomon encoder means for receiving a standard stream of bits and encoding said bit stream according to an ATSC 8-VSB standard;
   d) a hierarchical processing means for encoding a second bit stream of high priority information bits, wherein said second bit stream comprises a first portion of bits to be encoded as a robust ATSC bit stream and a second portion of bits to be encoded as a low priority embedded bit stream; and
   e) a packet multiplexer device having a first input coupled to an output of said first Reed-Solomon encoder means and having a second input coupled to an output of said hierarchical processing means, said multiplexer capable of multiplexing said standard stream and said second bit stream, wherein
   symbols of said new bit stream are transmitted according to a hierarchical VSB (H-VSB) symbol mapping technique.

2. The digital signal transmission system as claimed in claim 1, wherein symbols of said new bit stream are transmitted according to a mapping scheme selected from a pseudo 2-VSB symbol mapping scheme and a 4-VSB symbol mapping scheme.

3. The digital signal transmission system as claimed in claim 1, wherein symbols of said new bit stream are mapped according to either one of said pseudo 2-VSB symbol mapping scheme and 4-VSB symbol mapping scheme are transmitted in a backwards compatible manner.

4. The digital signal transmission system as claimed in claim 3, further comprising:
   a first Reed-Solomon encoder means for receiving a standard stream of bits and encoding said standard stream according to an ATSC 8-VSB standard;
   a second Reed-Solomon encoder means for receiving a stream of high priority information bits and encoding said stream of high priority information bits to generate said new bit stream; and,
   multiplexing means for multiplexing said standard 8-VSB bit stream and said new bit stream for transmission.

5. The digital signal transmission system as claimed in claim 4, wherein said second Reed-Solomon encoder means further comprises a packet formatter device for buffering an input of high priority information bit stream and grouping said information bit stream into a predetermined number of bytes.

6. The digital signal transmission system as claimed in claim 4, further comprising:
   a data interleaver device that rearranges bytes of the multiplexed standard 8-VSB bit stream and said new bit stream during an interleaving process;
   a trellis encoder device coupled to an output of said data interleaver device for encoding bytes of said standard 8-VSB bit stream and said new bit stream; and,
   a symbol mapper device coupled to said trellis encoder for mapping encoded bits into an associated symbol level according to an associated symbol mapping scheme.

7. The digital signal transmission system as claimed in claim 6, wherein only information bits of each said bytes of said new bit stream are to be encoded by said trellis encoder device.

8. The digital signal transmission system as claimed in claim 7, wherein said information bits of each said bytes of said new bit stream are least significant bits (LSB) bits corresponding to bits 6, 4, 2, and 0.

9. The digital signal transmission system as claimed in claim 1, wherein the standard 8-VSB bit stream and new bit stream capable of transmitting high priority information bits are transmitted according to a defined bit-rate ratio.

10. The digital signal transmission system as claimed in claim 1, wherein said new bit stream has a lower Threshold of Visibility (TOV) than said standard 8-VSB bit stream.

11. The digital signal transmission system as claimed in claim 1, further comprising:
    a second Reed-Solomon encoder means for receiving said first portion of bits to be encoded as a robust ATSC bit stream;
    a third Reed-Solomon encoder means for receiving said second portion of bits to be encoded as a low priority 8-VSB embedded bit stream; and,
    a packet formatter device for combining said robust ATSC bit stream and said low priority 8-VSB embedded bit stream for input to said second input of said packet multiplexer device.

12. The digital signal transmission system as claimed in claim 11, wherein said packet formatter device comprises means for generating bytes, each byte having most significant bits (MSBs) at bits (7,5,3,1) corresponding to high priority bits and least significant bits LSBs at bits (6,4,2,0) correspond to the 8-VSB embedded bit stream.

13. The digital signal transmission system as claimed in claim 11, further comprising:
    a data interleaver device for rearranging bytes of the multiplexed standard 8-VSB bit stream and new bit stream during an interleaving process; and,
    a trellis encoder device coupled to an output of said data interleaver device for encoding said bytes of either said standard 8-VSB bit stream or said new bit stream; and,
    a symbol mapper device coupled to said trellis encoder for mapping encoded bits into an associated symbol level according to an associated symbol mapping scheme, wherein said symbol mapper device generates an output symbol R corresponding to a combination of three bits $Z_0$, $Z_1$ and $Z_2$, a value of R comprising $(-1-\alpha)$ assigned to a combination of $Z_2$, $Z_1$ and $Z_0$ equal to (011) and, a value of R comprising $(1+\alpha)$ assigned to a combination of $Z_2$, $Z_1$ and $Z_0$ equal to (100), wherein $\alpha$ has a variable value of a whole number.

14. A digital signal transmission system, comprising:

means for generating a first Advanced Television Systems Committee (ATSC) standard 8-Vestigal Side Band (8-VSB) bit stream;

means for generating a new bit stream that transmits high priority information bits, said new bit stream and said standard 8-VSB bit stream being simultaneously transmitted over a fixed bandwidth communications channel to a receiver device, wherein a data rate of said standard 8-VSB bit stream is inversely related to a degree of robustness of information bits comprising said new bit-stream;

a first Reed-Solomon encoder means for receiving a standard stream of bits and encoding said stream according to an ATSC 8-VSB standard;

a second Reed-Solomon encoder means for receiving a stream of high priority information bits and encoding said stream of high priority information bits to generate said new bit stream;

multiplexing means for multiplexing said standard 8-VSB bit stream and new bit stream for transmission;

a data interleaver device that rearranges the bytes of the multiplexed standard 8-VSB bit stream and new bit stream during an interleaving process;

a trellis encoder device coupled to an output of said data interleaver device for encoding bytes of said standard 8-VSB bit stream and said new bit stream; and, a symbol mapper device coupled to said trellis encoder for mapping encoded bits into an associated symbol level according to an associated symbol mapping scheme, wherein symbols of said new bit stream mapped according to either one of pseudo 2-VSB symbol mapping technique and 4-VSB symbol mapping technique are transmitted in a backwards compatible manner, only information bits of each said bytes of said new bit stream are to be encoded by said trellis encoder device, and said symbol mapper device generates an output R corresponding to a combination of three bits $Z_0$, $Z_1$ and $Z_2$, said pseudo 2-VSB symbol mapping technique including making $Z_1$ and $Z_2$ bits equal to the information bit to result in an output R having one of four possible symbol values from an alphabet comprising $\{-7, -5, 5, 7\}$, wherein a sign of said symbol indicates a robust information bit.

15. A digital signal transmission system, comprising:

means for generating a first Advanced Television Systems Committee (ATSC) standard 8-Vestigal Side Band (8-VSB) bit stream;

means for generating a new bit stream that transmits high priority information bits, said new bit stream and said standard 8-VSB bit stream being simultaneously transmitted over a fixed bandwidth communications channel to a receiver device, wherein a data rate of said standard 8-VSB bit stream is inversely related to a degree of robustness of information bits comprising said new bit-stream;

a first Reed-Solomon encoder means for receiving a standard stream of bits and encoding said stream according to an ATSC 8-VSB standard;

a second Reed-Solomon encoder means for receiving a stream of high priority information bits and encoding said stream of high priority information bits to generate said new bit stream;

multiplexing means for multiplexing said standard 8-VSB bit stream and new bit stream for transmission;

a data interleaver device that rearranges bytes of the multiplexed standard 8-VSB bit stream and new bit stream during an interleaving process;

a trellis encoder device coupled to an output of said data interleaver device for encoding bytes of said standard 8-VSB lit stream and said new bit stream; and, a symbol mapper device coupled to said trellis encoder for mapping encoded bits into an associated symbol level according to an associated symbol mapping scheme, wherein symbols of said new bit stream mapped according to either one of pseudo 2-VSB symbol mapping technique and 4-VSB symbol mapping technique are transmitted in a backwards compatible manner, only information bits of each said bytes of said new bit stream are to be encoded by said trellis encoder device, and said symbol mapper device generates an output R corresponding to a combination of three bits $Z_0$, $Z_1$ and $Z_2$, said 4-VSB symbol mapping technique including making $Z_1$ equal to the information bit and $Z_2$ equal to $Z_0$ to result in an output R having one of four possible symbol values from an alphabet comprising $\{-7, -3, 3, 7\}$.

16. A digital signal transmission system, comprising:

means for generating a first Advanced Television Systems Committee (ATSC) standard 8-Vestigal Side Band (8-VSB) bit stream;

means for generating a new bit stream that transmits high priority information bits, said new bit stream and said standard 8-VSB bit stream being simultaneously transmitted over a fixed bandwidth communications channel to a receiver device, wherein a data rate of said standard 8-VSB bit stream is inversely related to a degree of robustness of information bits comprising said new bit-stream;

a first Reed-Solomon encoder means for receiving a standard stream of bits and encoding said stream according to an ATSC 8-VSB standard;

a second Reed-Solomon encoder means for receiving a stream of high priority information bits and encoding said stream of high priority information bits to generate said new bit stream;

multiplexing means for multiplexing said standard 8-VSB bit stream and new bit stream for transmission;

a data interleaver device that rearranges bytes of the multiplexed standard 8-VSB bit stream and new bit stream during an interleaving process;

a trellis encoder device coupled to an output of said data interleaver device for encoding bytes of said standard 8-VSB bit stream and said new bit stream;

a symbol mapper device coupled to said trellis encoder for mapping encoded bits into an associated symbol level according to an associated symbol mapping scheme; and a "non-systematic" Reed Solomon encoder device coupled to said data interleaver device and said trellis encoder device, said "non-systematic" Reed Solomon encoder device for providing with backward compatibility for an existing ATSC 8-VSB receiver.

17. The digital signal transmission system as claimed in claim 16, wherein a packet formatter device further comprises means for adding packet identifier (PID) bytes to said new bit stream for enabling said digital signal transmission system to implement said "non-systematic" Reed Solomon encoder device when processing said new bit stream.

18. A method for transmitting digital signals comprising the steps of:
   a) receiving a standard stream of bits and Reed-Solomon encoding said stream according to an ATSC 8-VSB standard;
   b) receiving a stream of high priority information bits and Reed-Solomon encoding said stream of high priority information bits to generate a new bit stream;
   c) multiplexing said standard 8-VSB bit stream and new bit stream for simultaneous transmission over a fixed bandwidth communications channel to a receiver device capable of receiving said standard 8-VSB bit stream and new bit stream, wherein a data rate of said standard bit stream is inversely related to a degree of robustness of information bits comprising said new bit-stream, wherein symbols of said new bit stream are transmitted according to a mapping scheme selected from a pseudo 2-VSB symbol mapping scheme and 4-VSB symbol mapping scheme;
   d) receiving a standard stream of bits and Reed-Solomon encoding said standard stream according to an ATSC 8-VSB standard;
   e) receiving a second bit stream of high priority information bits, said second bit stream comprising a first portion of bits to be encoded as a robust ATSC bit stream and a second portion of bits to be encoded as a low priority embedded bit stream; and,
   f) multiplexing said standard 8-VSB bit stream and said second bit stream for simultaneous transmission.

19. The method for transmitting digital signals according to claim 18, wherein said step b) further includes the step of buffering an input of high priority information bit stream and grouping said high priority information bit stream into a predetermined number of bytes.

20. The method for transmitting digital signals according to claim 19, wherein said step b) further includes the step of adding packet identifier (PID) bytes to said new bit stream for enabling said "non-systematic" Reed Solomon encoding when processing said new bit stream.

21. The method for transmitting digital signals according to 18, further comprising the steps of:
   rearranging bytes of the multiplexed standard 8-VSB bit stream and new bit stream during an interleaving process;
   trellis-encoding said bytes of the multiplexed standard 8VSB bit stream and said new bit stream; and,
   mapping encoded bits into an associated symbol level according to an associated symbol mapping scheme, wherein only information bits of each said bytes of said new bit stream are to be encoded by said trellis encoding.

22. The method for transmitting digital signals according to claim 21, wherein said information bits of each said bytes of said new stream are least significant bits (LSB) bits corresponding to bits 6, 4, 2, and 0.

23. The method for transmitting digital signals according to claim 21, further comprising the step of providing "non-systematic" Reed-Solomon encoding after said trellis encoding for providing backward compatibility for an existing ATSC 8-VSB receiver.

24. The method for transmitting digital signals according to claim 18, further comprising the steps of:
   receiving said first portion of bits of said second bit stream and Reed-Solomon encoding said first portion to generate a robust ATSC bit stream;
   receiving said second portion of bits of said second bit stream and Reed-Solomon encoding said second portion to generate a low priority embedded bit stream; and,
   combining said robust ATSC bit stream and said low priority embedded bit stream prior to said multiplexing of said standard 8-VSB bit stream and said second bit stream.

25. The method for transmitting digital signals according to claim 24, further including the steps of:
   buffering an input of high priority information bit stream; and,
   grouping said bit stream into a predetermined number of bytes, each byte having most significant bits (MSBs) at bits (7,5,3,1) corresponding to high priority bits and least significant bits LSBs at bits (6,4,2,0) correspond to the embedded stream.

26. The method for transmitting digital signals according to claim 25, further comprising:
   rearranging the bytes of the multiplexed standard 8-VSB bit stream and new bit stream during an interleaving process; and,
   trellis encoding bytes of said standard 8-VSB bit stream and said new bit stream; and,
   mapping encoded bits into an associated symbol level according to an associated symbol mapping scheme, said mapping including generating an output symbol R corresponding to a combination of three bits $Z_0$, $Z_1$ and $Z_2$, a value of R comprising $(-1-\alpha)$ assigned to a combination of $Z_2$, $Z_1$ and $Z_0$ equal to (011) and, a value of R comprising $(1+\alpha)$ assigned to a combination of $Z_2$, $Z_1$ and $Z_0$ equal to (100), wherein $\alpha$ has a variable value.

27. A method for transmitting digital signals, comprising the steps of:
   receiving a standard stream of bits and Reed-Solomon encoding said stream according to an ATSC 8-VSB standard;
   receiving a stream of high priority information bits and Reed-Solomon encoding said stream of high priority information bits to generate a new bit stream;
   multiplexing said standard 8-VSB bit stream and new bit stream for simultaneous transmission over a fixed bandwidth communications channel to a receiver device capable of receiving said standard 8-VSB bit stream and new bit stream, wherein a data rate of said standard bit stream is inversely related to a degree of robustness of information bits comprising said new bit-stream;
   rearranging bytes of the multiplexed standard 8-VSB bit stream and new bit stream during an interleaving process;
   trellis-encoding said bytes of the multiplexed standard 8-VSB bit stream and said new bit stream; and,
   mapping encoded bits into an associated symbol level according to an associated symbol mapping scheme, wherein only information bits of each said bytes of said new bit stream are to be encoded by said trellis encoder device, wherein symbols of said new bit stream are transmitted according to a mapping scheme selected from pseudo 2-VSB symbol mapping scheme and 4-VSB symbol mapping scheme, and said mapping step includes the step of generating an output R corresponding to a combination of three bits $Z_0$, $Z_1$ and $Z_2$, said pseudo 2-VSB symbol mapping technique including the step of making $Z_1$ and $Z_2$ bits equal to the information bit to result in an output R having one of four possible symbol values from an alphabet comprising $\{-7, -5, 5, 7\}$, wherein a sign of said symbol indicates a robust information bit.

28. A method for transmitting digital signals, comprising the steps of:

receiving a standard stream of bits and Reed-Solomon encoding said stream according to an ATSC 8-VSB standard;

receiving a stream of high priority information bits and Reed-Solomon encoding said stream of high priority information bits to generate a new bit stream;

multiplexing said standard 8-VSB bit stream and new bit stream for simultaneous transmission over a fixed bandwidth communications channel to a receiver device capable of receiving said standard 8-VSB bit stream and new bit stream, wherein a data rate of said standard bit stream is inversely related to a degree of robustness of information bits comprising said new bit-stream;

rearranging bytes of the multiplexed standard 8-VSB bit stream and new bit stream during an interleaving process;

trellis-encoding said bytes of the multiplexed standard 8-VSB bit stream and said new bit stream; and, mapping encoded bits into an associated symbol level according to an associated symbol mapping scheme, wherein only information bits of each said bytes of said new bit stream are to be encoded by said trellis encoder device, wherein symbols of said new bit stream are transmitted according to a mapping scheme selected from a pseudo 2-VSB symbol mapping scheme and 4-VSB symbol mapping scheme, and said mapping step includes the step of generating an output R corresponding to a combination of three bits $Z_0$, $Z_1$ and $Z_2$, said 4-VSB symbol mapping technique including the step of making $Z_1$ equal to the information bit and $Z_2$ equal to $Z_0$ to result in an output R having one of four possible symbol values from an alphabet comprising $\{-7, -3, 3, 7\}$.

29. A flexible digital transmission system comprising a digital television signal transmitter and digital television receiver, said transmitter comprising:

means for generating a first Advanced Television Systems Committee (ATSC) standard 8-VSB bit stream;

means for generating an encoded new bit stream that transmits high priority information bits, wherein symbols of said new bit stream are being transmitted according to a transmission mode selected from group comprising a pseudo 2-VSB mode, a 4-VSB mode, and a hierarchical-VSB (H-VSB) transmission mode, each mode characterized as having symbols mapped according to a respective symbol mapping scheme; and, multiplexer means for multiplexing symbols representing said standard 8-VSB bit stream and said new bit stream for simultaneous transmission over a terrestrial channel according to a broadcaster defined bit-rate ratio, wherein in each of said pseudo 2-VSB and 4-VSB modes, one bit of information is transmitted per symbol, and transmission of a new bit-stream according to one of said 2-VSB, 4-VSB, and H-VSB transmission modes requires mapping of symbols to possible symbol values from an alphabet comprising respectively, $\{-7, -5, 5, 7\}$, $\{7, 3, -3, -7\}$, and $\{7, 5, 3, -3, -5, -7\}$.

30. The flexible digital transmission system comprising a digital television signal transmitter and digital television receiver as claimed in claim 29, wherein a data rate of said first Advanced Television Systems Committee (ATSC) standard 8-VSB bit stream is inversely related to a degree of robustness of information bits comprising said new bit-stream.

31. The flexible digital transmission system comprising a digital television signal transmitter and digital television receiver as claimed in claim 29, wherein said new bit-stream is multiplexed at the packet level.

32. The flexible digital transmission system comprising a digital television signal transmitter and digital television receiver as claimed in claim 29, whereby in said 2-VSB and H-VSB modes, a sign of a symbol indicates a robust information bit.

33. The flexible digital transmission system comprising a digital television signal transmitter and digital television receiver as claimed in claim 29, whereby in said 2-VSB, 4-VSB and H-VSB modes, the information bit is trellis coded using a trellis encoder device.

34. The flexible digital transmission system comprising a digital television signal transmitter and digital television receiver as claimed in claim 29, wherein said transmitter further comprises a "non-systematic" Reed-Solomon encoder optionally utilized to add parity bytes to a robust bit-stream packets to ensure backward compatibility with an existing receiver device.

35. A flexible digital transmission system comprising a digital television signal transmitter and digital television receiver, said transmitter comprising:

means for generating a first Advanced Television Systems Committee (ATSC) standard 8-VSB bit stream;

means for generating an encoded new bit stream that transmits high priority information bits, wherein symbols of said new bit stream are being transmitted according to a transmission mode selected from group comprising a pseudo 2-VSB mode, a 4-VSB mode, and a hierarchical-VSB (H-VSB) transmission mode, each mode characterized as having symbols mapped according to a respective symbol mapping scheme; and, multiplexer means for multiplexing symbols representing said standard 8-VSB bit stream and said new bit stream for simultaneous transmission over a terrestrial channel according to a broadcaster defined bit-rate ratio, wherein in each of said pseudo 2-VSB and 4-VSB modes, one bit of information is transmitted per symbol, said transmitter further comprises a "non-systematic" Reed-Solomon encoder optionally utilized to add parity bytes to a robust bit-stream packets to ensure backward compatibility with an existing receiver device, and said transmitter further comprises means for providing information needed to decode robust packets at said receiver device, said information including an indication of 2-VSB, 4-VSB, H-VSB transmission mode, and, an indication of whether said optional non-systematic RS encoder was utilized and an indication of a number of new stream packets per field.

* * * * *